United States Patent [19]

Parker et al.

[11] Patent Number: 5,421,608
[45] Date of Patent: Jun. 6, 1995

[54] TRIM PANEL HAVING INTEGRAL SIR DOOR COVER

[75] Inventors: Thomas Parker, Strafford; Peter Iannazzi, Hampstead; John Gray, Union; Lee Gridley, Ossipee, all of N.H.

[73] Assignee: Davidson Textron Inc., Dover, N.H.

[21] Appl. No.: 202,069

[22] Filed: Feb. 25, 1994

[51] Int. Cl.6 .................................................. B60R 21/16
[52] U.S. Cl. .................................. 280/728.3; 280/732
[58] Field of Search .................... 280/728 B, 731, 732, 280/728 A

[56] References Cited

U.S. PATENT DOCUMENTS

| | | | |
|---|---|---|---|
| 4,120,516 | 10/1978 | Takamatsu et al. | 280/728 B |
| 4,562,025 | 12/1985 | Gray | 264/126 |
| 4,610,620 | 9/1986 | Gray | 425/434 |
| 5,131,678 | 7/1992 | Gardner et al. | 280/732 |
| 5,222,760 | 6/1993 | Rafferty | 208/728 B |
| 5,354,095 | 10/1994 | M/ller et al. | 280/728 B |

Primary Examiner—Kenneth R. Rice
Attorney, Agent, or Firm—Reising, Ethington, Barnard, Perry & Milton

[57] ABSTRACT

A laminated instrument panel has a door cover for concealing a supplemental inflatable restraint (SIR) system in a vehicle passenger compartment that includes a skin flap that is an integral part of the skin of the instrument panel. The skin flap is cast out of position and collapsed into the correct position when an elastomeric foam layer is foamed in place beneath the cast skin. This forms slanted grooves in the skin at the juncture of the flap and the adjacent skin of the instrument panel that have little or no gap at the surface of the skin. The skin flap can be shaped to provide a flush door or a raised door with an overlapping front edge.

13 Claims, 2 Drawing Sheets

TRIM PANEL HAVING INTEGRAL SIR DOOR COVER

BACKGROUND OF THE INVENTION

This invention relates generally to supplemental inflatable restraint systems often referred to as SIR or airbag systems. More particularly, this invention relates to a trim panel such as an instrument panel, having an integral door cover for concealing the SIR system in a vehicle passenger compartment.

SUMMARY OF THE INVENTION

U.S. Pat. No. 5,131,678 granted to John A. Gardner, Richard D. Rhodes, Jr. and Everett Hastings Jul. 21, 1992 discloses an air bag cover door that is part of a decorative panel for a steering wheel. The panel comprises an inner aluminum substrate, an outer flexible vinyl skin and an intermediate elastomeric urethane foam layer. The vinyl skin is cast with a rectangular deep and narrow groove that defines a door. The cast vinyl skin is then placed in a mold in a spaced relationship with the backing plate after which the intermediate layer is foamed in place. The bottom of the rectangular groove is then cut at least part way through on three sides to enhance a weakened section that includes an U-shaped cut line in the backing plate.

While the cover door of the above patent is well suited for its intended purpose, it has an aesthetic drawback that results from the way in which the vinyl skin is manufactured. As a practical matter, the vinyl skin is cast even though the patent specification states that it can also be preformed from plastic sheet stock, blow molded or injection molded. Moreover, the vinyl skin is cast in a tool that has a groove for forming a depending portion containing the groove of the vinyl skin. The tool is nickel plated for imparting a surface pattern to the cast vinyl skin. This nickel plating places a practical limitation on the configuration of the groove so that it is not possible to reduce the width of the groove below 1 millimeter for a depth of 6 to 8 millimeters. This range is the desirable depth for the depending portion of the skin that reduces the thickness of the underlying elastomeric layer that must be fractured to open the door for airbag deployment. Thus the cast vinyl skin ends up with a rectangular groove that is wider than is desirable from an aesthetic standpoint.

Another drawback that results from the way in which the vinyl skin is manufactured is that the bottom of the rectangular groove is cut at least part way through on three sides after the vinyl skin is cast.

The object of this invention is to provide a trim panel that has an integral door cover for a SIR system that avoids at least one of the drawbacks noted above.

Another object of this invention is to provide a trim panel that has an integral door cover or skin for a SIR system that is partially outlined by a tear seam groove that leaves very little if any visible gap between the edge of the integral door cover and the adjacent edge of the remaining trim panel.

Still another object of this invention is to provide a trim panel that has a shaped skin that includes an integral door cover for a SIR system that is partially outlined by a tear seam groove that does not require any cutting after the skin is shaped by casting or the like.

A feature and advantage of the trim panel of this invention is that the trim panel has a shaped skin which includes an integral door cover that is formed out of position and then repositioned so that there is very little if any visible gap between the tear seam edges of the door cover and the adjacent edges of the remaining trim panel.

Another feature and advantage of the invention is that the integral door cover can be automatically repositioned by a foaming process when the trim panel is a laminate that includes an underlying elastomeric foam layer.

Yet another feature and advantage of the invention is that the integral door cover can be designed to provide either a flush door cover or an overlapping door cover when it is repositioned.

Still yet another feature and advantage of this aspect of the invention is that integral door cover has a tear seam groove that is slanted so that it is deep yet essentially gapless at the surface of the trim panel.

BRIEF DESCRIPTION OF THE DRAWINGS

The above and other objects, features and advantages of the invention will become more apparent from the following description taken in conjunction with the accompanying drawings wherein like references refer to like parts and wherein.

DESCRIPTION OF THE INVENTION

Figure 1:
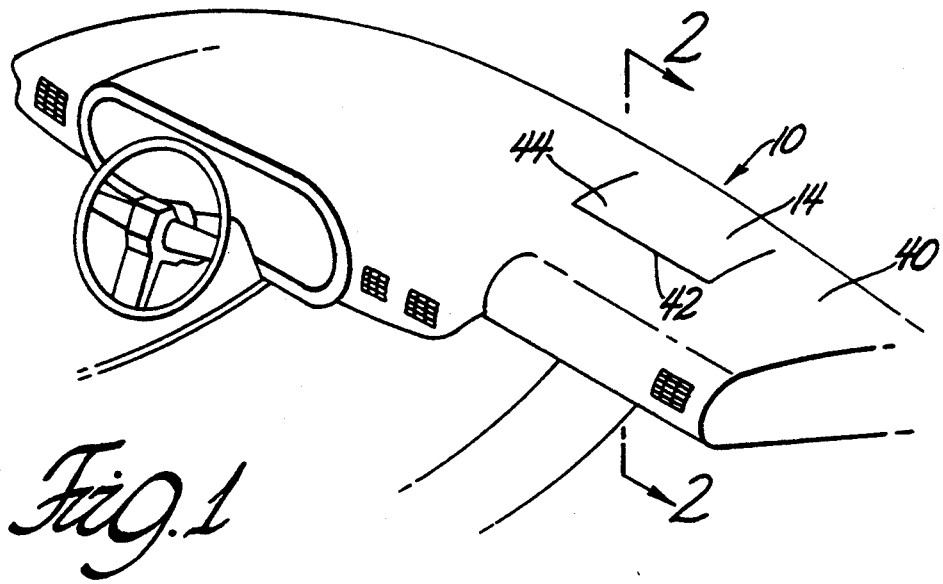
FIG. 1 is a perspective view of an automotive instrument panel that includes an integral door cover made in accordance with this invention.

Referring now to the drawing, FIG. 1 shows an instrument panel 10 having a SIR (airbag) system 12 located beneath an integral door cover 14 constructed in accordance with this invention. In this particular instance, the airbag restraint system 12 is located beneath the top of the instrument panel on the passenger side of the vehicle. However the integrated door cover of this invention can be used on the driver side as part of a trim panel for the steering wheel; on either side as part of the front or facing portion of the instrument panel; or as part of any other trim panel that is strategically positioned in the passenger compartment.

The SIR system 12 includes an airbag housing 16 that encloses a gas generator 18 for supplying an inflatant to an airbag 20 that is collapsed, folded and packed in the housing 16. The folded airbag 20 includes an inlet end 22 connected to a passage for flow of the inflatant from the gas generator 18 into the airbag. The airbag also includes a nose end 24 at the opposite end of the folds that is positioned to open the door 14 when the airbag 20 inflates.

Figure 2:
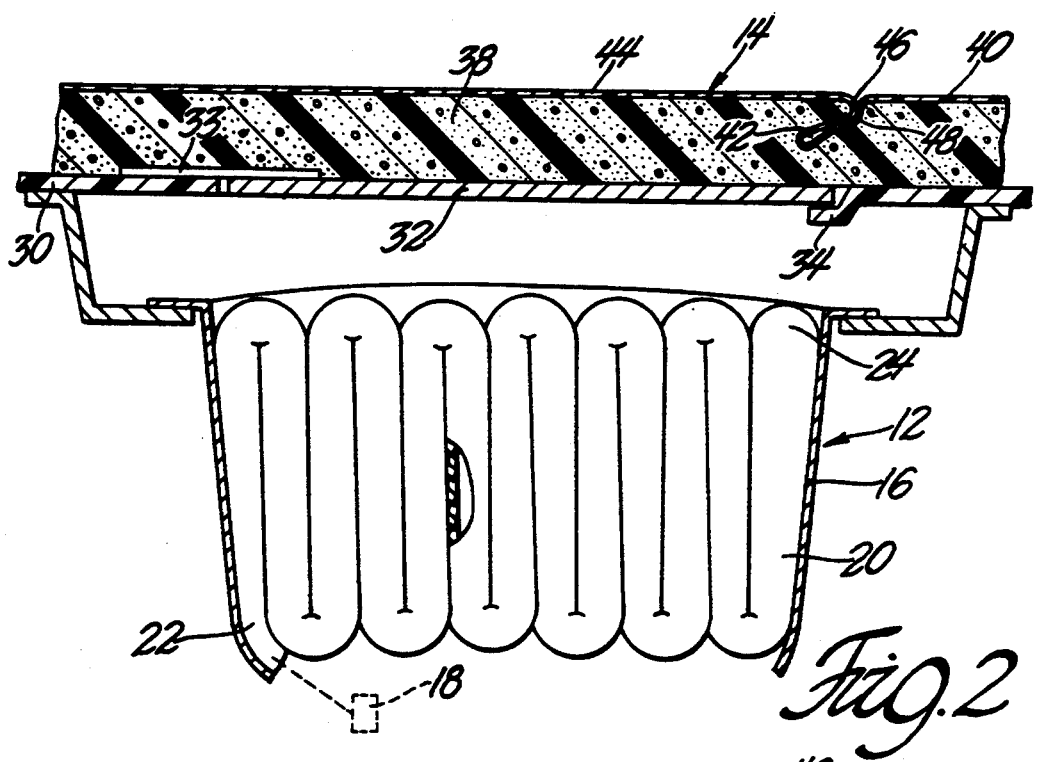
FIG. 2 is a fragmentary sectional view of a first embodiment of the invention taken substantially along the line 2—2 of FIG. 1 looking in the direction of the arrows.

The instrument panel 10 comprises a substrate or support 30 of structural plastic material such as Polycarbonate (P.C.), Polycarbonate-acrylonitrile-Butadiene-Styrene (PC/ABS), or Styrene Maleic Anhydride that is insert molded as part of the instrument panel itself. The substrate 30 has a rectangular opening for deployment of the air bag 20 that is closed by a door 32 of steel, aluminum, other light weight metal or various plastic materials. The rearward end of the door 32 is connected to the substrate 30 by a hinge 33. The opposite or front end of the door 32 is supported on a depressed lip or ledge 34 of the substrate 30 at the front edge of the rectangular opening for the door 32 when the door 32 is in the closed position as shown in FIG. 2.

The airbag housing 16 is supported beneath the door covering 14 by a depending rectangular plastic bracket that is welded or otherwise suitably secured to the bottom of the substrate 30.

The outer surface of the substrate 30 and the hinged door 32 is bonded to a layer of a suitable energy absorbing elastomeric foam, such as urethane foam that forms a cushion 38 in an underlying relationship to a polymeric skin or shell 40 of vinyl or the like that forms an outer decorative surface of the instrument panel 10.

The skin 40 has grooves 42 in a U-shaped pattern that outline and provide tear lines or weakened sections for a flap 44 that is aligned with the hinged door 32. These grooves 42 are visually perceivable from the exterior of the instrument panel 10. However, the grooves 42 are created so that very little if any gap exists between the edges of the flap 44 and the adjacent edges of the skin 40 at the surface of the instrument panel 10. Consequently, the grooves 42 improve the aesthetic appearance of the instrument panel 10 as explained below.

Figure 3:
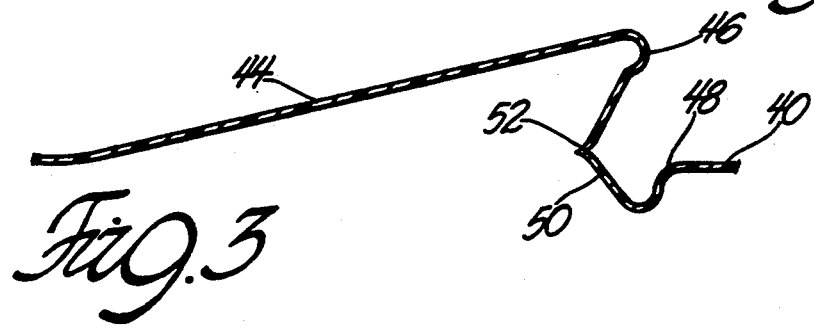
FIG. 3 is an enlarged fragmentary sectional view similar to FIG. 2 showing the cast skin of the instrument panel shown in FIG. 2.

Referring now to FIG. 3, the polymeric skin 40 may be shaped in any suitable manner, for example by a drysol casting process such as that disclosed in U.S. Pat. Nos. 4,562,025 and 4,610,620 granted to John D. Gray Dec. 31, 1985 and Sep. 9, 1986 respectively. These patents are hereby incorporated in this patent specification by reference. Other examples of processes or methods for shaping the polymeric skin 40 include vacuum forming, blow molding and reaction injection molding.

In any event, the skin 40 is cast or shaped so that the flap 44 is out of position and at an angle so that the front edge 46 of the flap 44 is spaced a considerable distance from an adjacent edge 48 of the skin 40 that defines a front edge of an opening for the door 14. The front edges 46 and 48 are connected to each other by a concave v-shaped membrane portion 50 of the skin 40 that has a weakened seam 52 at the apex. The front edges 46 and 48 are also curved in a complementary manner so that the front edge 46 of the flap 44 is supported by the front edge 48 when the flap 44 is repositioned as explained below. The side edges of the flap 44 are also spaced from the adjacent side edges of the door opening and the respective side edges are also connected by concave V-shaped membranes. However, the spacing between the respective side edges and the size of the side membranes diminish from the front end to the back end of the flap 44 that is from right hand end to left hand end as viewed in FIG. 3.

Figure 4:
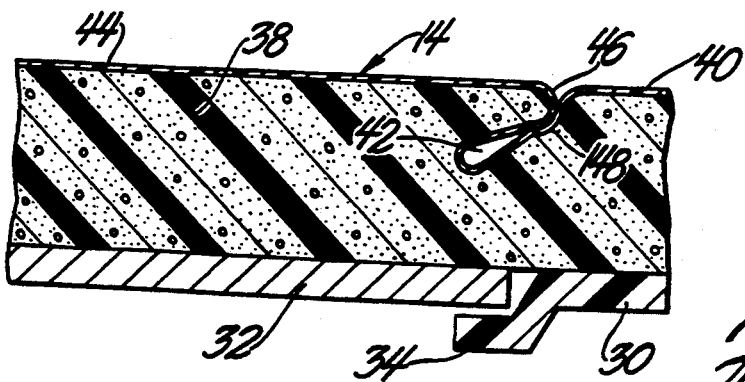
FIG. 4 is an enlarged fragmentary sectional view similar to FIG. 3 showing the cast skin of FIG. 3 incorporated in the instrument panel of FIG. 2.

To manufacture the instrument panel 10, the vinyl skin 40 with the flap 44 out-of-position as shown in FIG. 3 is turned upside down and placed in the cavity of a conventional mold that has a cavity that is shaped to correspond to the desired shape of instrument panel 10. The substrate 30 and hinged door backing 32 are then placed in the mold in a spaced relationship to the skin 40 and the mold is closed. Alternatively these components can be attached to a mold cover and automatically placed in the cavity when the mold is closed. Either way, the intermediate elastomeric layer 38 is then foamed in place repositioning the flap 44 in the process. More particularly, the foam layer 38 which is generated during the foaming operation forces the vinyl skin 40 against a surface of the mold cavity of the desired shape flattening the angled flap 44 and collapsing the membrane 50 and side membranes until the edge 46 is a supported flush position next to the edge 48 as shown in FIGS. 2 and 4. FIG. 4 is a fragmentary enlargement of the instrument panel after the foaming operation has been completed and the instrument panel has been demolded and turned right side up.

This produces slanted grooves 42 that have considerable depth but very little if any gap between the edges 46 and 48 at the surface of the instrument panel 10. Thus the slanted grooves 42 improve the aesthetic appearance of the instrument panel 10 while preserving the essential function of providing weakened sections and/or tear lines in the foam layer 38 as well as in the vinyl skin 40.

Figure 5:
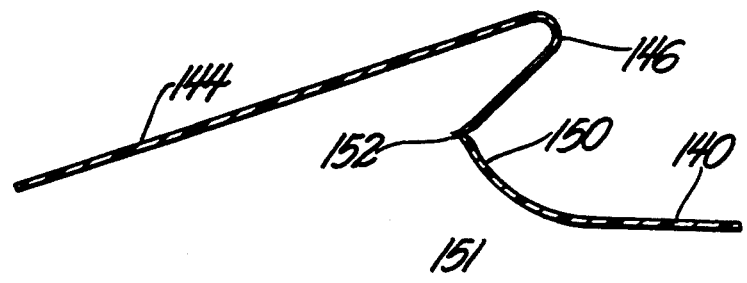
FIG. 5 is an enlarged fragmentary sectional view similar to FIG. 3 showing a second embodiment or version of a cast skin for an instrument panel that is made in accordance with this invention.

FIG. 5 shows an alternate shape for the vinyl skin that produces an overlapping door cover when it is repositioned. In this instance the vinyl skin 140 is still shaped so that it has a flap 144 that is out of position at an angle so that the front edge 146 of the flap 144 is spaced a considerable distance from the front edge 148 of the skin 140 that defines the opening for the door. The front edges 146 and 148 are still connected to each other by a concave v-shaped membrane portion 150 of the skin 140 that has a weakened seam 152 at the apex. However, the membrane portion 150 includes a curved leg 151 that extends from the apex of the membrane 150 and merges smoothly into the skin 140 so that the front edge 148 is not distinct until the flap 144 is repositioned.

Figure 6:
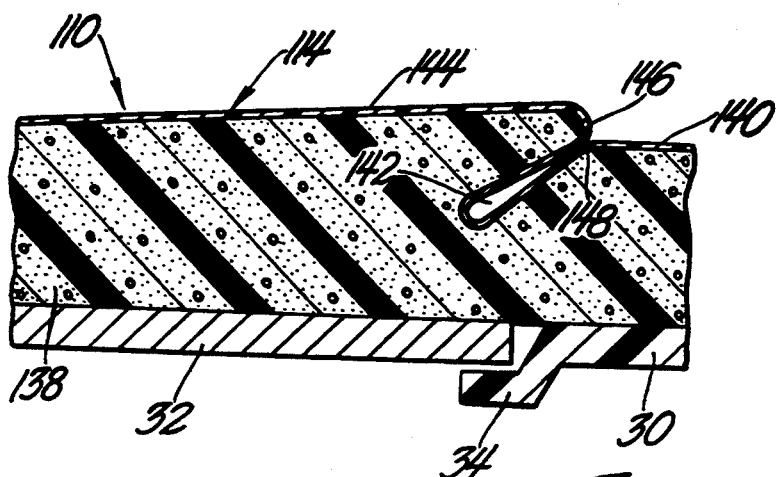
FIG. 6 is an enlarged fragmentary sectional view similar to FIG. 4 showing the cast skin of FIG. 5 incorporated in the instrument panel of this invention.

To manufacture instrument panel 110 that has an overlapping door cover 114 as shown in FIG. 6, the vinyl skin 140 shaped with the flap 144 out-of-position as shown in FIG. 5 is also turned upside down and placed in the cavity of a conventional mold that has a cavity that is shaped to correspond to the desired shape of the instrument panel. The same substrate 30 and hinged door 32 of the earlier embodiment are placed in a spaced relationship inside the cavity of a closed mold. The intermediate elastomeric layer 138 is then foamed in place. As the intermediate layer 138 is generated during the foaming operation it forces the vinyl skin 140 against a surface of the mold cavity of the desired shape flattening the flap 144 and collapsing the membrane 150 and side membranes until the front edge 148 is formed and the front edge 146 of the flap 144 rests on the front edge 148 as shown in FIG. 6 which is an enlargement of the instrument panel 110 after the foaming operation has been completed and the instrument panel has been demolded and turned right side up. The foaming operation and repositioning of the flap 144 produces the appearance of a separate door that is slightly raised in an overlapping relationship at the front edge of the door cover 114. However, the method still produces slanted grooves 142 that have considerable depth but very little if any gap between the edges 146 and 148. Thus the slanted grooves 142 still improve the aesthetic appearance of the instrument panel 10 with this overlapping door cover configuration while still preserving the essential function of providing weakened sections and/or tear lines in the foam layer 138 as well as in the vinyl skin 140.

Both of the foregoing instrument panels operate in the same manner. When the gas generator 18 is triggered due to a predetermined vehicle deceleration, the airbag 20 inflates at the nose end 24 first and then progressively back toward the inlet end 22. Consequently the nose end 24 engages the metal door reinforcement 32 near the lip 34 and pivots the door 14 or 114 outwardly about hinge 33. As the door pivots outwardly, the foam layer 38 or 138 and the skin 40 or 140 is fractured at the weakened sections or tear lines to create a separated flap 44 or 144 and an opening for deployment of the airbag 20 that corresponds with the rectangular opening in the substrate 30.

The invention has been described in an illustrative manner, and it is to be understood that the terminology which has been used is intended to be in the nature of words of description rather than of limitation.

Obviously, many modifications and variations of the present invention in light of the above teachings may be made. It is, therefore, to be understood that, within the scope of the appended claims, the invention may be practiced otherwise than as specifically described.

embodiments of the invention in which an exclusive property or privilege is claimed are defined as follows:

1. A laminated trim panel having a door cover for concealing an airbag system in a vehicle passenger compartment and a polymeric skin that includes a skin flap that is an integral part of the door cover comprising:
    the polymeric skin having a depending portion that contains a slanted groove for providing a weakened section or tear seam between the flap and the remaining part of the polymeric skin,
    a layer of energy absorbing elastomeric foam underlying the polymeric skin, and
    the groove being formed so that it is deep enough to provide a weakened section in the layer of energy absorbing elastomeric foam and conceals a weakened seam at the base on the groove and so that there is very little if any gap between the edge of the flap and the adjacent edge of the remaining part of the polymeric skin at the surface of the trim panel.

2. The laminated trim panel as defined in claim 1 wherein the slanted groove is formed by repositioning the flap.

3. The laminated trim panel as defined in claim 1 wherein the slanted groove is formed by repositioning the flap so that the edge of the flap engages the adjacent edge of the remaining part of the polymeric skin at the surface of the trim panel.

4. The laminated trim panel as defined in claim 1 wherein the edge of the flap engages the adjacent edge of the remaining part of the polymeric skin at the surface of the trim panel.

5. The laminated trim panel as defined in claim 1 further comprising a substrate and a door underlying the layer of energy absorbing elastomeric foam, the door being hinged to the substrate at one end and having an edge portion at an opposite end and the substrate having a ledge supporting the edge portion of the door.

6. A method for making a laminated trim panel having a door cover for concealing an airbag system in a vehicle passenger compartment and a polymeric skin that includes a skin flap that is an integral part of the door cover comprising:
    shaping a polymeric skin so that it includes an integral skin flap that is out of position, placing the shaped polymeric skin in a mold, and
    foaming a layer in place beneath the polymeric skin so that the layer generated in the foaming process repositions the skin flap so that the flap has an edge that is near the adjacent edges of the remaining part of the polymeric skin.

7. A method for making a laminated trim panel having a door cover for concealing an airbag system in a vehicle passenger compartment and a polymeric skin that includes a skin flap that is an integral part of the door cover comprising:
    shaping a polymeric skin so that it includes an integral skin flap that is out of position and at an angle so that the skin flap has an edge that is spaced a considerable distance from an adjacent edge of the remaining part of the polymeric skin,
    placing the shaped polymeric skin in a mold, and
    foaming an elastomeric layer in place beneath the polymeric skin so that the layer generated in the foaming process flattens the skin flap so that the edge of the skin flap is repositioned close to the adjacent edge of the remaining part of the polymeric skin.

8. The method for making a laminated trim panel as defined in claim 7 wherein the edge of the skin flap is connected to the adjacent edge of the remaining part of the polymeric skin by a concave membrane that is collapsed when the elastomeric layer is foamed in place.

9. The method as defined in claim 7 wherein the layer generated in the foaming process flattens the skin flap until the edge of the skin flap is supported on the adjacent edge of the remaining part of the polymeric skin.

10. The method as defined in claim 8 wherein the concave membrane is V-shaped and is collapsed until the edge of the skin flap is supported in a flush position on the adjacent edge of the remaining part of the polymeric skin.

11. The method as defined in claim 8 wherein the concave membrane has an apex and a curved leg that extends from the apex and merges smoothly with the remaining part of the polymeric skin and the concave membrane is collapsed until the edge of the skin flap is supported in an overlapping position on the adjacent edge of the remaining part of the polymeric skin.

12. The method as defined in claim 8 wherein the membrane is collapsed until it forms a slanted groove.

13. The method as defined in claim 8 wherein the membrane is collapsed until it forms a slanted groove and the edge of the skin flap is supported on the adjacent edge of the remaining part of the polymeric skin.

* * * * *